United States Patent [19]
Marcus et al.

[11] Patent Number: 6,036,495
[45] Date of Patent: Mar. 14, 2000

[54] INTERACTIVE SIMULATION INCLUDING FORCE FEEDBACK

[75] Inventors: Beth A. Marcus, Lexington; Timothy Osborne; Bin An, both of Arlington; Brian Eberman, Somerville, all of Mass.

[73] Assignee: Microsoft Corporation, Redmond, Wash.

[21] Appl. No.: 09/017,764

[22] Filed: Feb. 3, 1998

[51] Int. Cl.[7] ................................................. G09B 5/00
[52] U.S. Cl. .............................. 434/45; 345/161; 463/38
[58] Field of Search ...................... 434/29, 45; 345/156, 345/161; 273/317.1, 445, 447; 463/1, 6, 7, 36, 38

[56] References Cited

U.S. PATENT DOCUMENTS

| | | | |
|---|---|---|---|
| 4,891,764 | 1/1990 | McIntosh | 364/508 |
| 5,044,956 | 9/1991 | Behensky et al. | 434/45 |
| 5,146,566 | 9/1992 | Hollis, Jr. et al. | 395/275 |
| 5,389,865 | 2/1995 | Jacobus et al. | 318/568.11 |
| 5,438,529 | 8/1995 | Rosenberg et al. | 364/709.1 |
| 5,576,727 | 11/1996 | Rosenberg et al. | 345/179 |

OTHER PUBLICATIONS

Russo, Massimo Andrea. "The design and implementation of a three degree of freedom force output joystick." Master of Science in Mechanical Engineering Thesis. Massachusetts Institute of Technology. May 1990.

Jamieson, R.S. (Report Preparer). Brooks, T.L. and Bejczy, A.K., (Inventors). "Survey of hand controllers for teleoperation." Technical Support Package. NASA Tech Brief 10:1:88. JPL Invention Report NPO–16610/6105. Jan. 1986.

Tadros, Alfred Heikal. "Control system design for a three degree of freedom virtual environment simulator using motor/brake pair actuators." Master of Science Thesis. Massachusetts Insitute of Technology. Feb. 1990.

Wright, Paul K. "A manufacturing hand." *Robotics & Computer–Integrated Manufacturing* 2:1 (1985). 13–23.

Iwata, Hiroo. "Artifical reality with force–feedback: development of desktop virtual space with compact mater manipulator." *Computer Graphics* 24:4. Aug. 1990. 165–170.

Ciarcia, Steve. "Build the Basic–52 computer/controller. A single–board problem solver with great potential." *BYTE The Small Systems Journal* 10:8 Aug. 1985. 10 pages.

Ouh–Young, Ming. "Force display in molecular docking." UMI Dissertation Services: Bell & Howell. Ann Arbor, MI. Order No. 9034744. 1990. 369 pages.

Adelstein et al, Design and Implementation of a Force Reflecting Manipulandum for Manual Control Research, NASA, pp. 1–11, Nov. 1992.

*Primary Examiner*—Glenn E. Richman
*Attorney, Agent, or Firm*—Ronald M. Anderson

[57] ABSTRACT

Interactive simulation including force feedback. The system includes a computer game display unit programmed with simulation rules. A control unit is connected to the computer and provides information and control signals to the computer to interact with the stored simulation rules and to receive information and control signals from the computer. A movable structure for movement in at least two degrees-of-freedom by an operator is interconnected to the control unit by means of actuators. A programmable unit processes signals and information from the computer to generate signals to drive the actuators so as to apply forces in the at least two degrees-of-freedom to the movable structure and thereby to the operator. The applied forces are based on internal programming within the programmable unit, events occurring in the simulation and movements of and forces applied to the movable structure by the operator. The system of the invention thereby provides continuous interaction among motion of and forces applied by the movable structure, the events in the simulation and forces applied to and applied by the movable structure.

11 Claims, 6 Drawing Sheets

INTERACTIVE SIMULATION INCLUDING FORCE FEEDBACK

BACKGROUND OF THE INVENTION

This invention relates to interactive simulations, and more particularly to simulations and games including force or touch feedback to a joystick or multi-axis controller or input device.

Interactive computer simulations and interactive video games often include a movable structure generally known as a joystick to provide inputs for the simulation or game. Oftentimes, the joystick is strictly an input device by which signals are conveyed to the processing unit of the computer. These joysticks do not provide any tactile or force feedback to the user.

The Atari Hard Drivin® video game provides one-dimensional force feedback to a steering wheel or a brake pedal. That is, during a game, torques are generated on the steering wheel which simulate those torques which would be experienced during, for example, cornering in a car. See also, U.S. Pat. No. 5,044,956. In a more general simulation context, control elements including force feedback are known in elaborate flight simulators costing many millions of dollars. Heretofore, there has been no multiple-degree-of-freedom joystick suitable for games and simulations and suitable for arcade and home use.

SUMMARY OF THE INVENTION

In accord with the present invention, an interactive force feedback simulation system adapted to be used with a computer programmed to implement a simulation is defined. This system includes a control unit adapted to couple with the computer to receive information and control signals and to provide information and input signals to the computer for use in controlling the simulation. The control unit stores equations and rules used to define a force feedback that varies in response to events in the simulation, as indicated by the information and control signals received from the computer. An operator manipulated component is coupled to the control unit and is movable by an operator in at least one degree-of-freedom. A sensor is disposed adjacent to the operator manipulated component and is employed for sensing an orientation of the operator manipulated component as it is moved through at least one degree-of-freedom. The sensor produces an orientation signal that is input to the control unit. Further, the input signal provided to the computer by the control unit is responsive to the orientation signal and is indicative of the orientation of the operator manipulated component in at least one degree-of-freedom. A motor controlled by the control unit is coupled through an actuator to the operator manipulated component to apply the force feedback thereto in at least one degree-of-freedom, as defined by the equations and rules stored in the control unit. The force feedback is also based on the events occurring in the simulation, as indicated by the information and control signals provided by the computer, and on the movement of the operator manipulated component by the operator, so that there is continuous interaction among the movement of the operator manipulated component, the events in the simulation, and forces applied to the operator manipulated component by the motor.

The control unit preferably includes a microprocessor that determines the force feedback based upon the control signal and information received from the computer and the equations and the rules stored in the control unit. In addition, the control unit includes an amplifier for providing an amplified drive current to the motor.

In one preferred form of the invention, the motor is coupled to the operator manipulated component through a transmission to apply the force feedback to the operator manipulated component. The transmission amplifies a torque applied to the operator manipulated component.

The motor preferably rotates a shaft that is coupled to the operator manipulated component. In this case, the sensor comprises an encoder that senses an orientation of the shaft and thus, senses the orientation of the operator manipulated component.

A terrain, which is included in the simulation, affects the force feedback applied to the operator manipulated component. Control signals and information provided to the control unit by the computer cause the control unit to apply the rules and equations stored in the control unit to determine a force feedback corresponding to the terrain in the simulation being implemented by the computer.

A plurality of different force feedbacks are predefined by the rules and equations stored in the control unit and the force feedback applied is selected by the control unit in response to the control signals that the control unit receives from the computer. The force feedback applied to the operator manipulated component can be determined by the control unit as a function of a velocity with which the operator manipulated component is moved.

The rules and equations stored in the control unit define real physical models of an environment.

Another aspect of the present invention is directed to a method for creating an interactive simulation using a computer programmed to implement the simulation. The method provides for implementing steps that are generally consistent with the functions performed by the elements of the system described above.

DESCRIPTION OF THE PREFERRED EMBODIMENT

Figure 1:
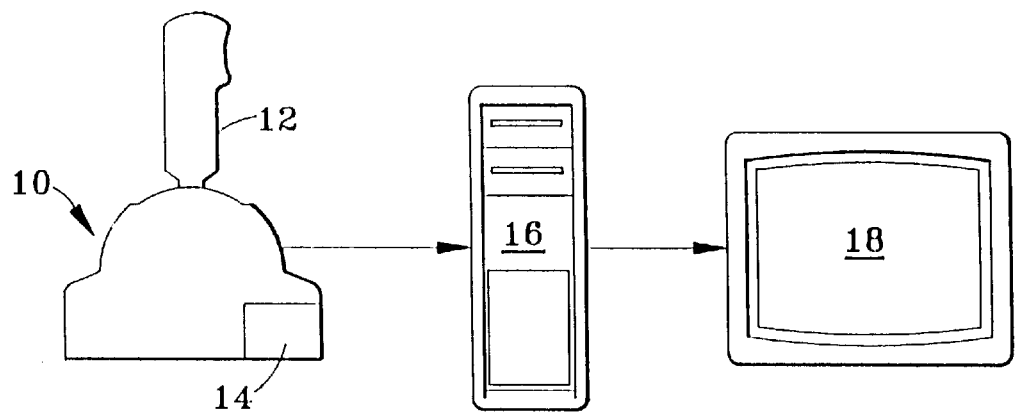
FIG. 1 is a block diagram illustrating the overall system of the invention.

The overall system of the invention is illustrated schematically in FIG. 1. A control unit 10 includes a movable structure such as a joystick 12. The control unit 10 also includes a programmable section 14. It will be appreciated that the unit 14 need not be a part of the control unit 10; it could be separate or part of the computer 16. A general purpose digital computer 16 such as a personal computer or game display unit is programmed with simulation or game rules. The output from the computer 16 is displayed on a video monitor 18. The control unit 10 is connected to the computer 16 and provides information and control signals to the computer 16 to interact with the stored simulation rules and to receive information and control signals from the computer 16. The programmable unit 14 processes signals and information from the computer 16 and generates inputs to, and processes outputs from the joystick 12.

Figure 2:
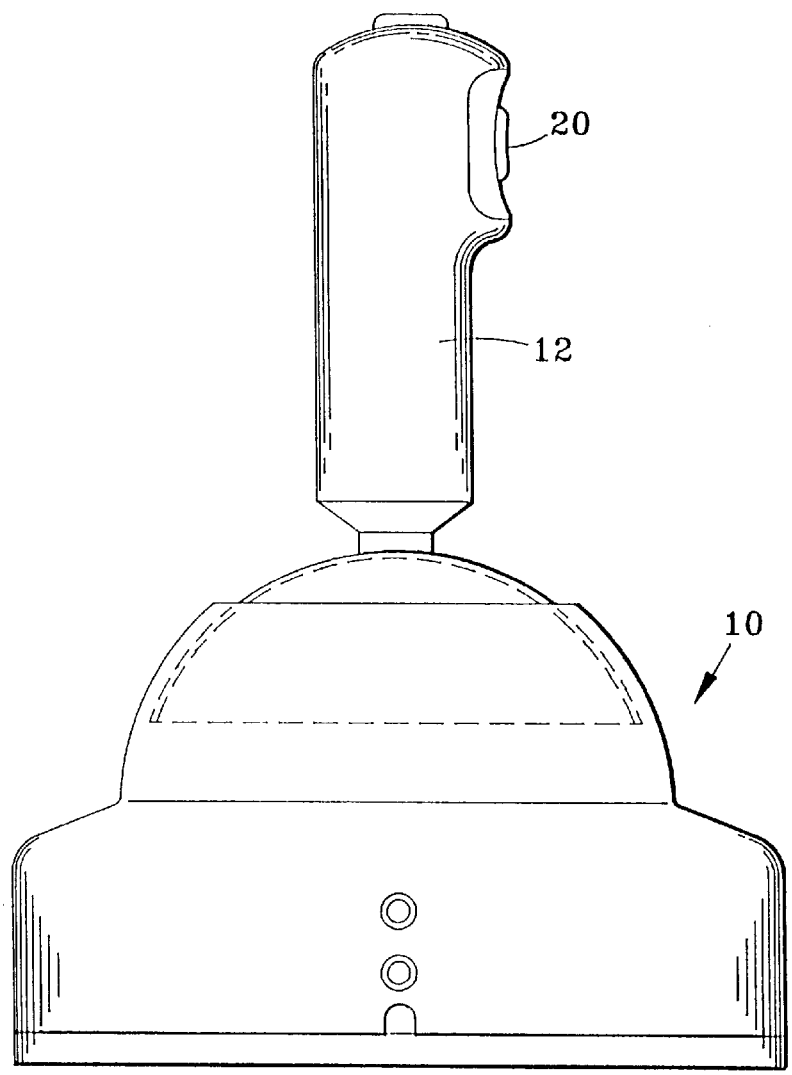
FIG. 2 is a plan view, with parts broken away, of the force feedback control unit of the invention.

With reference now to FIG. 2, the control unit 10 supports the movable structure or joystick 12 for two degrees-of-freedom motion with respect to the control unit 10. The joystick 12 also includes at least one button type switch 20 for sending signals to the computer 16.

Figure 3:
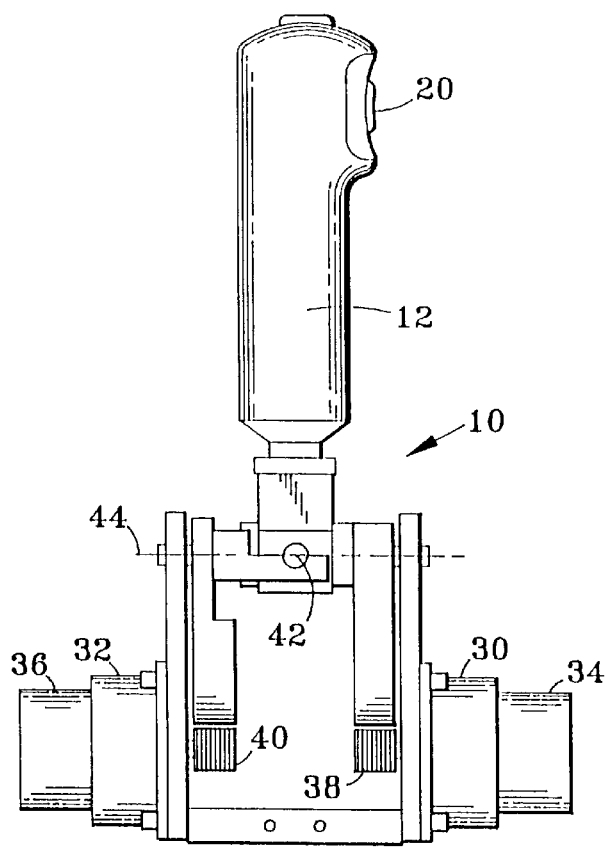
FIGS. 3 and 4 are side and front cross-sectional views, respectively, of the joystick control unit of the invention.
Figure 4:
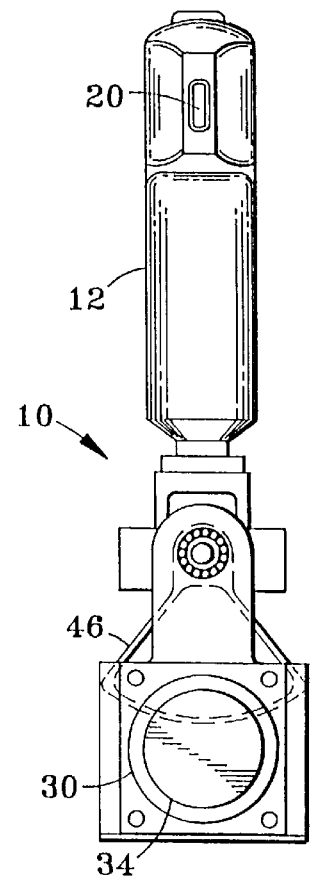

With reference now to FIGS. 3 and 4, the control unit 10 is shown without its cover. The control unit 10 includes electric motors 30 and 32 along with angular rotation sensors 34 and 36. The motors 30 and 32 include shafts bearing capstans 38 and 40. The sensor 34 responds to the angular orientation of capstan 38 and the sensor 36 responds to the angular orientation of the capstan 40 to generate signals for use by the programmable unit 14.

A cable transmission mechanism driven by the capstan 38 is adapted to rotate the joystick 12 about an axis 42, that is, left and right in FIG. 3. Similarly, the capstan 40 is adapted to rotate the joystick 12 about an axis 44 so that it moves into and out of the plane of FIG. 3. As shown in FIG. 4, a drum 46 cooperates with the capstan 38 to effect rotation. This transmission system has low backlash and low friction. The sensors 34 and 36 provide an output proportional to angular orientation of the respective motor 30 and 32 shafts.

As shown in FIG. 1, the control unit 10 is connected to the computer 16 so that information and control signals can pass in either direction between the control unit 10 and the computer 16. The programmable unit 14 may be included in the control unit 10 housing or may be part of the computer 16 itself. The programmable unit 14 processes signals from the computer 16 using internally stored rules and equations to generate signals to drive the motors 30 and 32 so as to produce forces with two degrees of freedom to the joystick 12 and to a user (not shown) operating the joystick 12. The applied forces are based on internal programming within the programmable unit 14, events occurring in the simulation and movements of and forces applied to the joystick 12 by an operator (not shown). The system therefore provides continuous interaction among motion of the joystick 12, events in the simulation and the forces applied to and applied by the joystick 12.

With reference now to FIGS. 5, 6, 7 and 8, another embodiment of the control unit 10 is described. A motor 50 through a linkage denoted generally at 52 rotates a shaft 54. The shaft 54 passes through an angular orientation sensor such as potentiometer or encoder 56. The shaft 54 causes a bracket 58 to move left and right in FIG. 6 and engages a lower portion 59 of the joystick 12 to cause the joystick 12 to move left and right in FIG. 5. The slotted bracket 58 is supported in bearings 60 and 61.

Similarly, a motor 62 drives a linkage 64 which rotates a shaft 68 which passes through a potentiometer or encoder 70. The shaft 68 causes a bracket 72 to rotate as shown in FIG. 6 to cause the joystick 12 to move into and out of the plane of FIG. 5. The bracket 72 is supported by bearings 73 and 74.

Figure 5:
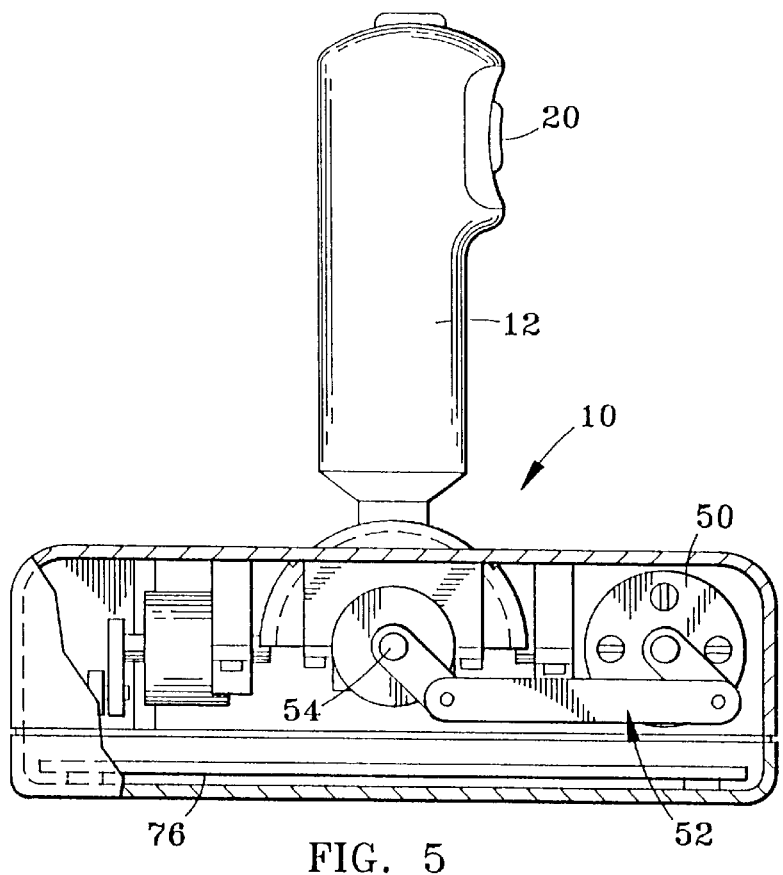
FIG. 5 is a cross-sectional view of an alternative embodiment of the invention.
Figure 6:
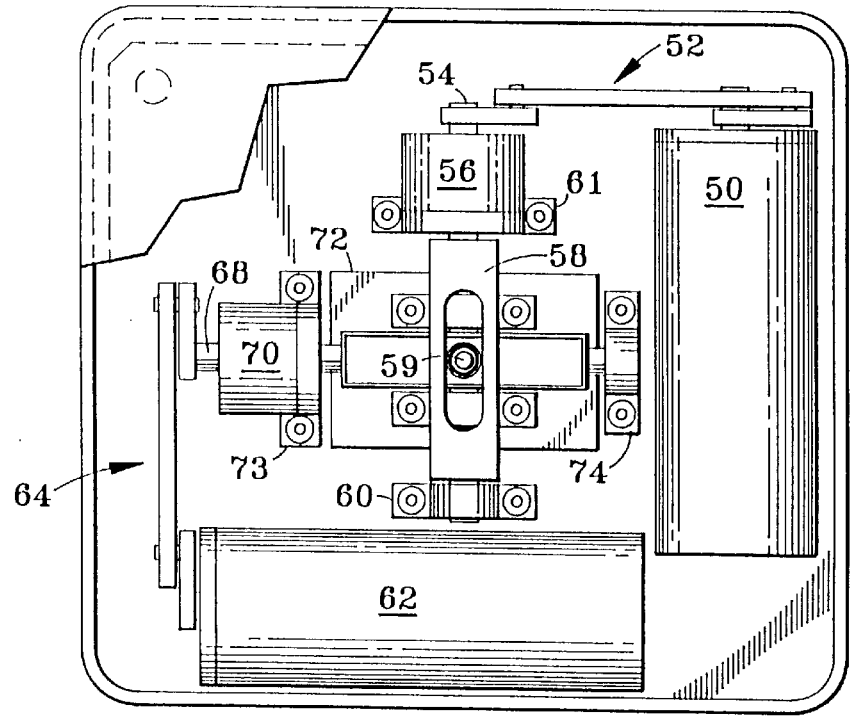
FIG. 6 is a bottom view of the embodiment of FIG. 5.
Figure 7:
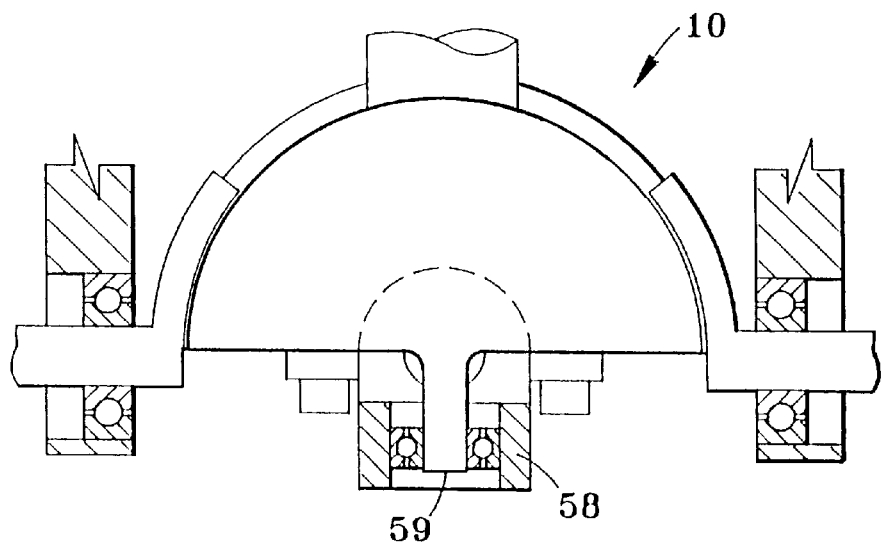
FIG. 7 is a detail taken from FIG. 5.
Figure 8:
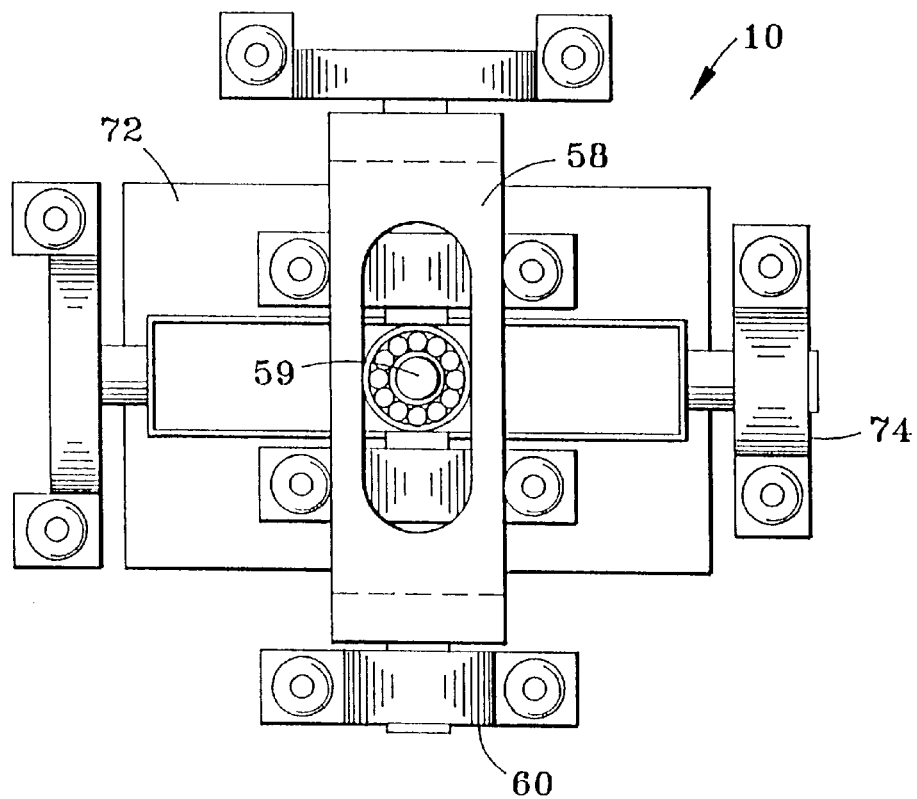
FIG. 8 is a detail taken from FIG. 6.

As will be appreciated, as the motors 50 and 62 are energized, the joystick 12 is driven with two degrees-of-freedom, that is, left and right and in and out of the plane of FIG. 5. The rotational sensors 56 and 70 provide electrical outputs proportional to the angular orientation of their respective shafts. With reference to FIG. 5, the programmable unit 14 is shown as a circuit board 76 which may include the motor control and signal processing electronics.

Figure 9:
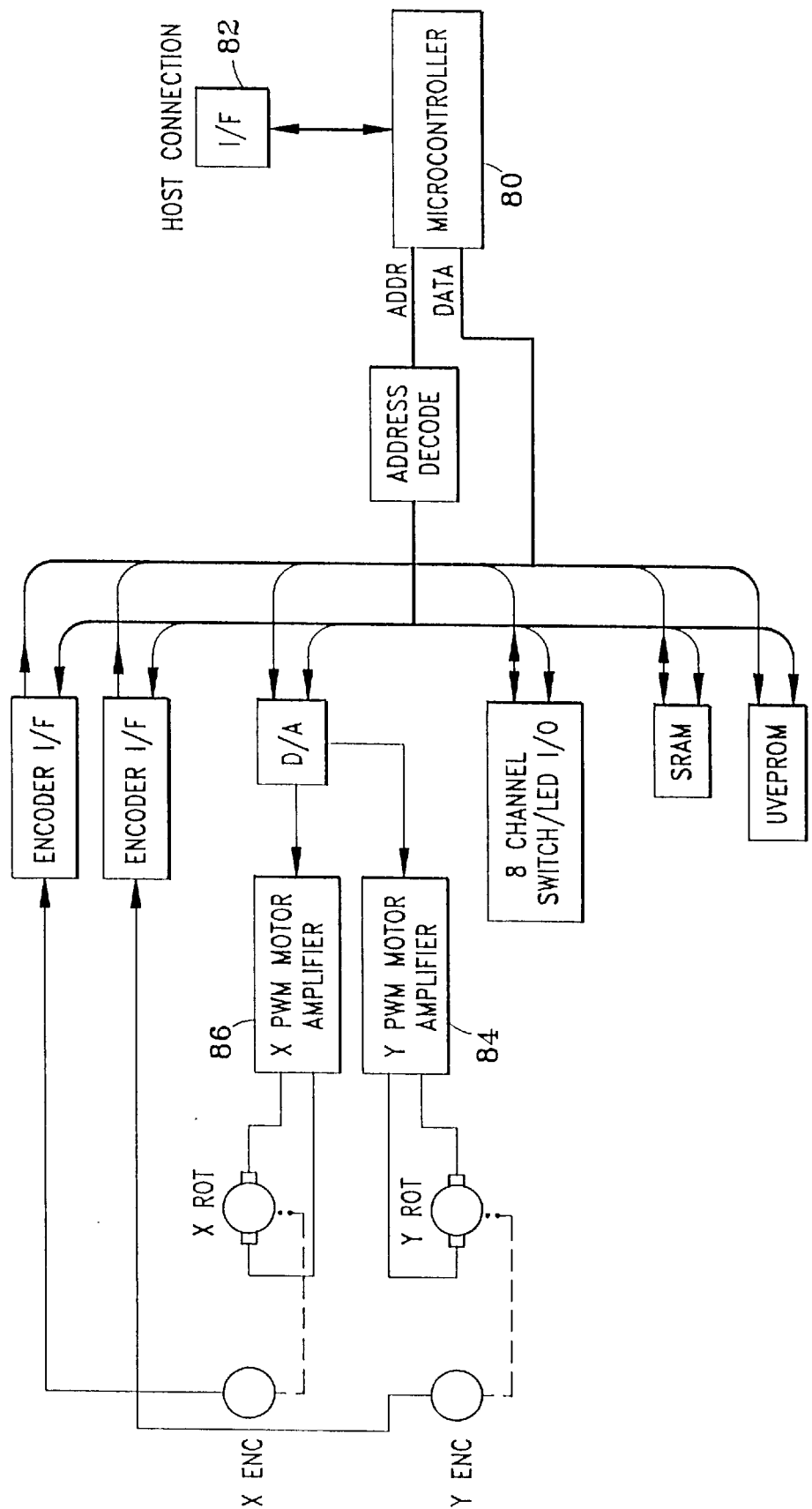
FIG. 9 is a block diagram of the signal and communication paths in the operation of the invention.

With reference now to FIG. 9 the programmable unit 14 includes a microcontroller 80 which communicates with the computer 16 (FIG. 1) through a host connection 82. The microcontroller 80 is any suitable processor such as a digital signal processor (DSP) or RISC architecture processor for enhanced operation. Further, the system can be designed for an upgradable processor core, independent of I/O hardware. In addition, the possibility exists of changing the controller's executable code from the host computer. This flexibility opens up the opportunity to customize the operation of the device for specific host applications. The microcontroller 80 executes boot code upon start up that loads in default operating firmware from on-board non-volatile memory (or removable media, e.g., memory cards) and waits for a host command to begin execution, or to download operational software. The default operation code provides general force feedback, positional, and other functions. Code downloaded to the microcontroller 80 from the host computer 16 can be tuned for specific functions and/or characteristics. The downloaded code can either be native executable binary or pseudocode for an on-board interpreter. An interpreter implementation removes the need for the host to know what processor resides on the control unit. Amplifiers 84 and 86 drive the motors 30 and 32 in the embodiment of FIG. 3 or the motors 50 and 62 in the embodiment of FIG. 6. It is to be noted that currents in the drive motors can be used to determine torque which can also be inferred from strain gauges or other types of force/torque sensors (not shown) on drive cables or shafts. It should also be noted that the torque transmission can be a four-bar linkage as illustrated in FIGS. 5 and 6, a cable transmission illustrated in FIGS. 3 or 4 or a belt or gear train. If desired for a particular application, a speed reduction can be built into the transmission to amplify the torque applied to the joystick 12. In applications where space and motor size are not constrained, the motors 50 and 62 can be directly mounted onto shafts 54 and 68 in FIG. 6 without transmissions.

Figure 10:
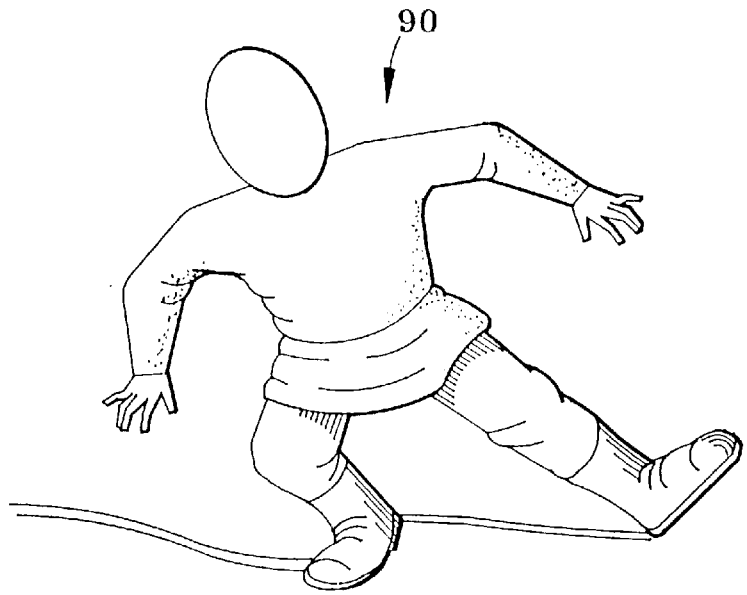
FIGS. 10 and 11 are perspective illustrations of a character in an interactive game with force feedback according to the invention.
Figure 11:
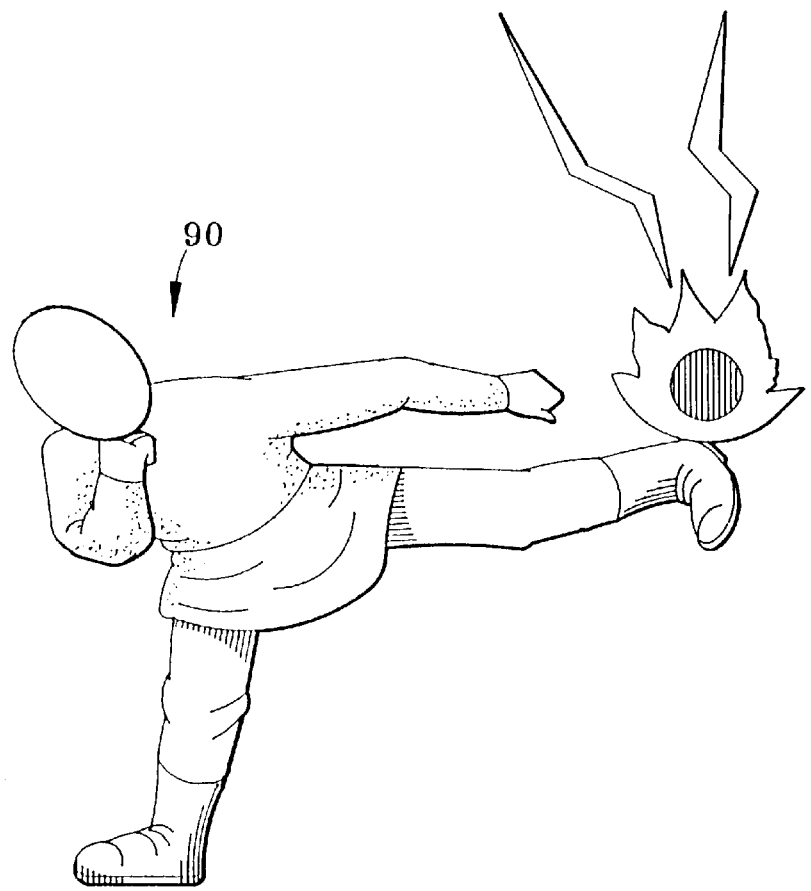

An example of a game or simulation illustrating the technology of the invention disclosed herein will now be described in conjunction with FIGS. 10 and 11. The system of the invention has been integrated into an IBM Windows demonstration game which itself does not form a part of this invention. In this exemplary game, a character 90 fights his way through a series of different terrains to reach a treasure (not shown). The walking, running, jumping, squatting, punching and kicking of the character 90 are controlled by movements of the joystick 12. When, for example, the character 90 hits a patch of ice, the force being felt by the player goes to zero and can in fact use the motion and forces applied by the operator to further exaggerate the effect by actively getting out of the way of the operator to simulate sliding. On rough terrain, vibrations and pulses are felt by the game player in proportion to the objects encountered. If the character 90 is jumping and hits a tree or other object, the player will feel the stiffness of the object through forces transmitted through the joystick 12. When the button 20 is depressed, the character 90 stops moving and kicks or punches as shown in FIG. 11. Depending on the nature of the object being punched or kicked, and also depending on other events in the game, the forces experienced by the player will be different. Also, the velocity of the motions change the forces felt as they would in real fighting. Real physical models of the environment and objects encountered are programmed into the programmable unit 14 so that feedback is virtually instantaneous and independent of the graphics update of the computer 16. This architecture also makes the game fully interactive in which game outcomes unanticipated by the programmers occur based on the performance of the player. Because of the force feedback, the player is more actively involved in the game since the forces applied to the joystick 12 realistically simulate forces which would be felt by the character 50 in the game.

What is claimed is:

1. An interactive force feedback simulation system adapted to be used with a computer programmed to implement a simulation, comprising:

(a) a control unit adapted to couple with the computer to receive information and control signals and to provide information and input signals to the computer for use in controlling the simulation, said control unit including a progammable digital memory for storing equations and rules used to define a force feedback that varies in response to events in the simulation, as indicated by the information and control signals received from the computer that cause the control unit to implement the force feedback, the plurality of equations and rules being modifiable by the computer to customize the force feedback;

(b) an operator manipulated component coupled to the control unit and movable by an operator in at least one degree-of-freedom;

(c) a sensor disposed adjacent to the operator manipulated component for sensing an orientation of the operator manipulated component as the operator manipulated component is moved through said at least one degree-of-freedom, said sensor producing an orientation signal that is input to the control unit, said input signal provided to the computer by the control unit being responsive to the orientation signal and being indicative of the orientation of the operator manipulated component in said at least one degree-of-freedom; and (d) a motor controlled by the control unit and coupled through an actuator to the operator manipulated component to apply the force feedback thereto in said at least one degree-of-freedom, as defined by the equations and rules stored in the control unit, said force feedback also being based on the events occurring in the simulation indicated by the information and control signals provided by the computer, and movement of the operator manipulated component by the operator, so that there is continuous interaction among the movement of the operator manipulated component, the events in the simulation, and forces applied to the operator manipulated component by the motor.

2. The interactive force feedback simulation system of claim 1, wherein the control unit includes a microprocessor that determines the force feedback based upon the control signal and information received from the computer and the equations and the rules stored in the control unit.

3. The interactive force feedback simulation system of claim 1, wherein the control unit includes an amplifier for providing an amplified drive current to the motor.

4. The interactive force feedback simulation system of claim 1, wherein the motor is coupled to the operator manipulated component through a transmission to apply the force feedback to the operator manipulated component.

5. The interactive force feedback simulation system of claim 4, wherein the transmission amplifies a torque applied to the operator manipulated component.

6. The interactive force feedback simulation system of claim 1, wherein the motor rotates a shaft that is coupled to the operator manipulated component, and wherein the sensor comprises an encoder that senses an orientation of the shaft and thus, senses the orientation of the operator manipulated component.

7. The interactive force feedback simulation system of claim 1, wherein a terrain included in the simulation affects the force feedback applied to the operator manipulated component, said control signals and information provided to the control unit by the computer causing the control unit to apply the rules and equations stored in the control unit to determine a force feedback corresponding to the terrain in the simulation being implemented by the computer.

8. The interactive force feedback simulation system of claim 1, wherein a plurality of different force feedbacks are predefined by the rules and equations stored in the control unit and the force feedback applied is selected by the control unit in response to the control signals that the control unit receives from the computer.

9. The interactive force feedback simulation system of claim 1, wherein the force feedback applied to the operator manipulated component is determined by the control unit as a function of a velocity with which the operator manipulated component is moved.

10. The interactive force feedback simulation system of claim 1, wherein the rules and equations stored in the control unit define real physical models of an environment.

11. A method for creating an interactive simulation using a computer programmed to implement said simulation, comprising the steps of:

(a) providing a control unit separate from the computer, said control unit including a programmable digital memory for storing a plurality of rules and equations that define force feedbacks applicable in the interactive simulation, the plurality of rules and equations being modifiable by the computer to customize the force feedbacks;

(b) enabling the control unit to receive information and control signals from the computer for use in determining a specific force feedback that should be applied;

(c) converting movement of an operator manipulated component into a corresponding input signal adapted to be supplied to the computer for use in the interactive simulation; and (d) applying a specific force feedback to the operator manipulated component, said specific force feedback being defined by the equations and rules stored in the programmable digital memory of the control unit, said specific force feedback also being based on events occurring in the interactive simulation, as indicated by the information and control signals provided by the computer, and by movement of the operator manipulated component by the operator, thereby providing a continuous interaction among the movement of the operator manipulated component, the events in the interactive simulation, and forces applied to the operator manipulated component.

* * * * *

UNITED STATES PATENT AND TRADEMARK OFFICE
CERTIFICATE OF CORRECTION

| | | |
|---|---|---|
| PATENT NO. | : 6,036,495 | Page 1 of 1 |
| APPLICATION NO. | : 09/017764 | |
| DATED | : March 14, 2000 | |
| INVENTOR(S) | : Beth A. Marcus et al. | |

It is certified that error appears in the above-identified patent and that said Letters Patent is hereby corrected as shown below:

On the title page
    Below "[22] Filed: Feb. 3, 1998"
    Insert -- Related U.S. Application Data
    [63] Continuation of Application No. 08/245,957,
    filed on May 19, 1994, now Pat. No. 6,004,134. --
Column 1, line 4,
    Below the title
    Insert -- This is a Continuation of Application No.
    08/245,957, filed on May 19, 1994, now Patent
    No. 6,004,134. --, therefor.

Signed and Sealed this

Eighth Day of July, 2008

JON W. DUDAS
*Director of the United States Patent and Trademark Office*